United States Patent

[11] 3,617,641

[72] Inventors James H. Fiet
Chicago;
Francis H. Hilbert, River Grove, both of Ill.

[21] Appl. No. 31,822
[22] Filed Apr. 29, 1970
[45] Patented Nov. 2, 1971
[73] Assignee Motorola, INc.
Franklin Park, Ill.
Continuation of application Ser. No. 797,528, Feb. 7, 1969, now abandoned.

[54] STEREO MULTIPLEX DEMODULATOR
16 Claims, 1 Drawing Fig.

[52] U.S. Cl. .......... 179/15 BT, 325/472
[51] Int. Cl. .......... H04h 5/00
[50] Field of Search .......... 179/15 BT; 325/36, 472, 480, 474

[56] References Cited

UNITED STATES PATENTS 3,272,923 9/1966 Csicsatka .......... 179/15
3,272,922 9/1966 Linz et al. .......... 179/15
3,167,615 1/1965 Wilhelm et al. .......... 179/15

*Primary Examiner*—Kathleen H. Claffy
*Assistant Examiner*—Thomas D'Amico
*Attorney*—Mueller & Aichele

ABSTRACT: A silicon, monolithic, integrated circuit, stereo multiplex demodulator includes a first-gated symmetrical demodulator for providing the desired left and right output signals. A second-gated synchronous demodulator similar to the first is supplied with the same composite input signals supplied to the first demodulator; but the signals supplied to the second demodulator are substantially attenuated, with the second demodulator are substantially attenuated, with the second demodulator providing output signals in phase opposition to the output signals supplied by the first demodulator. The outputs of the two demodulators are combined so that the crosstalk components are effectively eliminated, since the attenuation of the signal supplied to the second demodulator is chosen so that the output of the second demodulator is equal in magnitude to the crosstalk component in the output of the first demodulator.

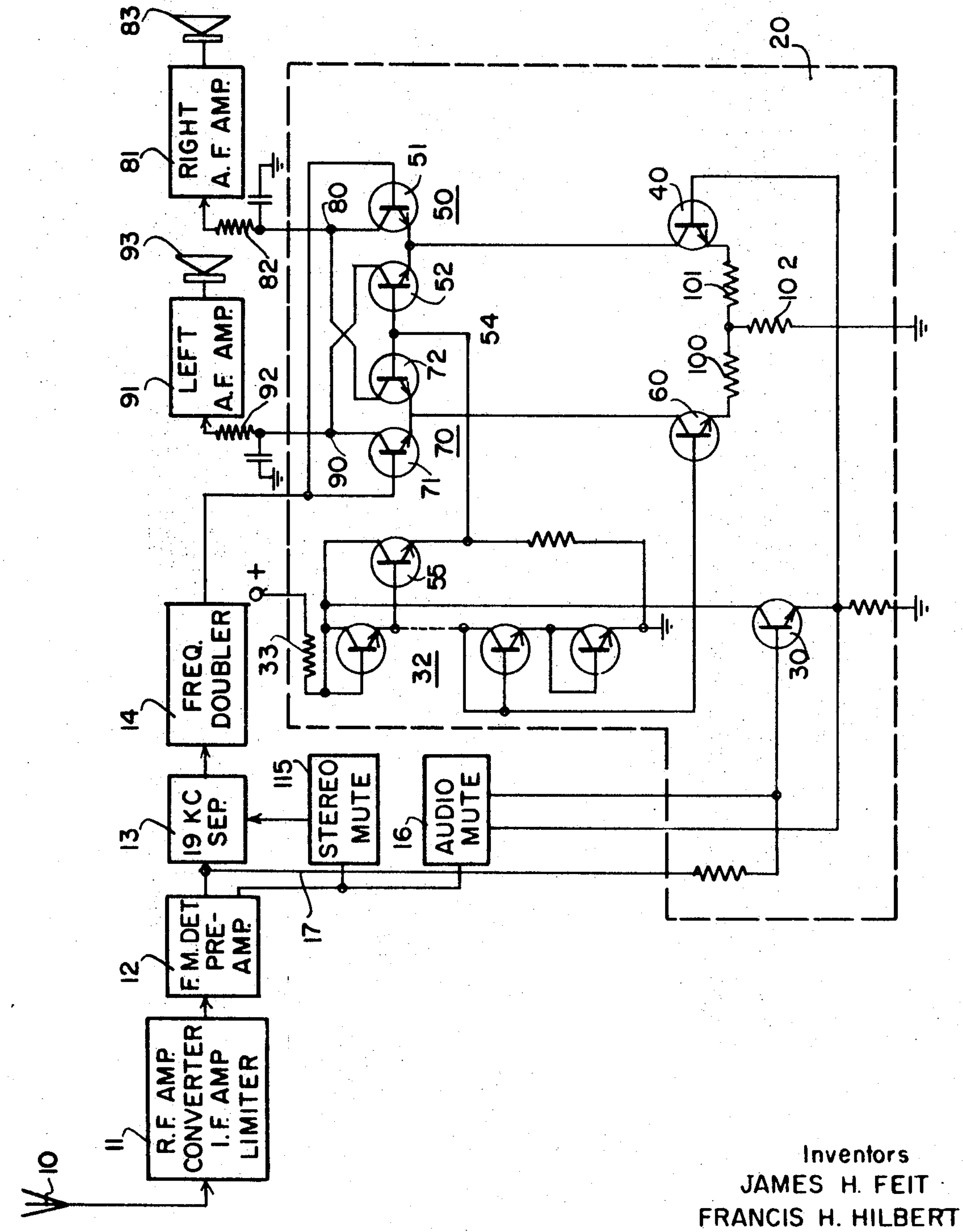
Inventors
JAMES H. FEIT
FRANCIS H. HILBERT
BY
Mueller, Aichele & Rauner
ATTYS.

STEREO MULTIPLEX DEMODULATOR

RELATED APPLICATION

This application is a continuation of application, Ser. No. 797,528, filed Feb. 7, 1969.

BACKGROUND OF THE INVENTION

In compatible stereophonic multiplex transmission, the composite stereo signal transmitted by a transmitting station comprises an audiofrequency summation signal (L+R) of the left channel and right channel information, a difference signal (L−R) of the same information amplitude modulated on a suppressed subcarrier, and a continuous wave pilot signal which presently is of 19 kc. The L+R signals range between 0 and 15 kc. and the L−R signals range between 23 and 53 kc., with the L−R signal represented by the side bands of a suppressed subcarrier of 38 kc. In addition some stations broadcast a background music channel which extends approximately 7 kc. on either side of a 67 kc. subcarrier signal. This background music channel generally is referred to as the "subsidiary communication authorization" (SCA) signal or "-storecast" signal and is not reproduced on home receivers.

Receipt of the 19 kc. pilot signal at the receiver is used to derive the 38 kc. subcarrier which then is supplied to a demodulation circuit for deriving the desired left and right audio information present in the stereo transmission. Since normal home receivers are not authorized to receive the SCA or "storecast" transmissions, such receivers must be provided with filters or other means for rejecting the SCA signals. In addition many receivers are prone to generate 57 kc. and 76 kc. signals in the regeneration process to cause mixing with the "-storecast" or SCA components to produced audio interference. The use of special or additional filters, however, to eliminate the "storecast" signals results in increased expense in the receiver in which such filters are used. In addition integrated circuit techniques do not readily lend themselves to the formation of filters using inductances and capacitances, so that it is desirable to provide some other means of ensuring that "storecast" signal rejection is obtained in a stereophonic demultiplexing circuit.

It has been found that "storecast" rejection can be obtained in a stereophonic demultiplexing circuit by using a grated synchronous demodulator operated by a symmetrical 38 kc. reference signal. Such a gated symmetrical demodulator, however, produces undesirable crosstalk components in each of the left and right outputs; so that a provision must be made for eliminating the crosstalk components in order to achieve the best possible stereophonic output from a system employing such demodulators.

Although circuits for eliminating or reducing the crosstalk components in the two outputs of stereophonic demodulators have been employed in the past, such circuits generally involve the use of cross-coupling reduced amounts of the outputs of the two channels into one another after the demodulation process has been effected. It is desirable to provide some means for eliminating crosstalk without cross-coupling the demodulator outputs so that the two outputs are effectively isolated from one another.

In addition it is desirable to provide a stereophonic demultiplexing demodulator, having efficient crosstalk elimination, in the form of an integrated circuit in order to effect the savings and operating advantages which are inherent in integrated circuits.

SUMMARY OF THE INVENTION

It is an object of this invention to provide in a stereo multiplex receiver an improved means for eliminating crosstalk between the channels.

It is an additional object of this invention to eliminate crosstalk between the channels at the output of the stereophonic demodulator by using an auxiliary demodulator supplied with an attenuated signal and providing an output in phase opposition with the primary demodulator; so that when the outputs of the two demodulators are combined, crosstalk components are eliminated.

In accordance with a preferred embodiment of this invention the composite stereo input signal to be demodulated is applied to a stereophonic demodulator having first and second outputs corresponding to first and second channels. Additional means also are provided responsive to the input signals for applying attenuated signals to the outputs of the demodulator with the amount of attenuation being proportional to the magnitude of the crosstalk components produced at the outputs of the stereophonic demodulator.

In accordance with a more specific embodiment of this invention, the composite stereo input signal is supplied to first and second demodulators, with the signal being applied directly to the first demodulator and being applied in substantially attenuated form to the second demodulator. In order to eliminate crosstalk between the outputs of the first demodulator, the outputs of the second demodulator are supplied in phase opposition to the outputs of the first demodulator and combined therewith, with the amount of attenuation of the signal supplied to the second demodulator being proportional to the magnitude of the crosstalk components in the outputs of the first demodulator.

BRIEF DESCRIPTION OF THE DRAWING

The drawing shows a circuit diagram, partially in block form, of a preferred embodiment of a stereophonic multiplex receiver having a demodulator according to the invention.

DETAILED DESCRIPTION

Referring now to the drawing, there is shown a stereophonic multiplex receiver including a demodulator circuit in the form of an integrated circuit which is indicated as enclosed by dotted lines in the drawing. A frequency modulated (FM) carrier wave containing the sum signal of the left and right audio signals (L+R), the difference signal of the left and right audio signals (L−R) amplitude modulated on a suppressed subcarrier wave, and a pilot signal having a frequency one-half that of the suppressed subcarrier frequency is received by an antenna 10 and is applied to a receiver circuit 11. The circuit 11 represents the usual RF amplifier, converter, IF amplifier, and limiter which may be of known design. The output of the circuit 11 then is supplied to an FM detector and preamplifier circuit 12 where the composite signal is detected.

When stereophonic signals are being received and detected by the detector 12, the 19 kc. pilot signal component is detected and separated by a 19 kc. signal separating circuit 13, which generally includes a tank circuit tuned to the 19 kc. signal frequency. The output of the 19 kc. signal separator is supplied to a frequency doubler 14 which reconstructs the suppressed subcarrier 38 kc. signal. The frequency doubler 14 should be of a type which provides a symmetrical output signal in order to provide the best possible "storecast" rejection in the system with which it is used.

Composite signals also are supplied from the output of the detector and preamplifier stage 12 over a lead 17 to the base of an input NPN-transistor 40, which is the signal input transistor for an integrated circuit stereo multiplex demodulator 20. A stable DC collector potential for the transistor 30 is obtained from a tap on a transistor voltage reference string 32 connected in series with a resistor 33 between a source of positive potential and ground. The transistors in the string 32 have their bases directly connected to their collectors and are forward biased to provide a constant voltage drop thereacross over a relatively wide range of current flowing through the string. The collector of the transistor 30 is shown as obtaining operating potential from the junction between the transistor string 32 and the resistor 33.

The transistor 30 is operated as an emitter follower, and the signals present on its emitter are applied to the base of a first demodulator input transistor 40 which is driven in accordance with the composite signals applied over the line 17 from the detector and preamplifier stage 12 to the base of the transistor 30. The collector of the transistor 40 is connected to the emitters of a pair of transistors 51 and 52 which are operated as a first-gated synchronous demodulator 50. Gating signals for the demodulator 50 are the 38 kc. signals obtained from the output of the frequency doubler circuit 14, and these signals are supplied directly to the base of the transistor 51. The base of the transistor 52 is supplied with a constant DC reference potential through a lead 54 connected to the output of an emitter follower 55, the base of which is controlled by a reference potential obtained from a tap on the voltage reference signal string 32.

The operation of the demodulator circuit 50 is such that the 38 kc. gating signals applied to the circuit from the frequency doubler circuit 14 are effective on each cycle to alternately render the transistors 51 and 52 conductive and nonconductive, with the transistor 52 being cut off, due to the differential action of the transistors 51 and 52, when the transistor 51 is driven to conduction and vice versa. At the same time, the transistor 40 is operated Class A; so that the composite input signals present on the collector of the transistor 40 effectively are coupled directly through the fully turned on transistor 51 or 52 to corresponding output terminals 80 or 90 connected to right and left audiofrequency amplifiers 81 and 91 through coupling resistors 82 and 92. The output of the amplifiers 81 and 91 are coupled to suitable loudspeakers 83 and 93, respectively.

By the use of the reintroduced 38 kc. subcarrier wave from the frequency doubler 14, it can be seen that the switching or gating of the demodulator transistors 51 and 52 in the demodulator 50 effectively separates the R signal envelope from the L signal envelope by causing these envelopes to be separately detected due to the alternate switching action of the transistors 51 and 52. In operation, a synchronous demodulator of the type used as the demodulator 50 produces a substantially equal and predictable amount of undesirable crosstalk at each of the output terminals 80 and 90, with the amount of crosstalk being of sufficient magnitude as to cause some degradation of performance of the receiver in which the demodulator is used.

In order to eliminate or substantially reduce the crosstalk present in the outputs from the demodulator 50, a second synchronous demodulator 70 is provided and includes a second pair of switching transistors 71 and 72 which correspond to the transistors 51 and 52 in the demodulator 50. The emitters of the transistors 71 and 72 are supplied with signals from the collector of a second demodulator input transistor 60, the base of which is connected to a source of DC reference potential obtained from a tap on the bias string 32. The same DC reference potential is applied to the bases of both of the transistors 40 and 60.

Input signals for driving the second demodulator input transistor amplifier 60 are coupled to the emitter of the transistor 60 through T-resistance circuit consisting of three transistors 100, 101 and 102, with the resistors 100 and 101 being connected in series between the emitter of the transistor 60 and the emitter of the transistor 40. The resistor 102 then is connected between ground and the junction of the resistors 100 and 101 to complete the T-circuit. As a result of this resistor circuit, the signals applied to the base of the transistor 40 from the input transistor 30 also appear in substantially attenuated form on the emitter of the transistor 60, with the degree of attenuation being determined by the relative values of the resistors 100, 101 and 102. The value of these resistors is chosen to provide an exact amount of attenuation to cause the primary signals appearing on the collectors of the transistors 71 and 72 to be equal in magnitude to the magnitude of the crosstalk signal components appearing at the outputs of the switching transistors 51 and 52 in the demodulator 50. Although the resistors 100, 101 and 102 are shown connected in a T-network, a TT-network will function equally as well, with the resistors 100 and 101 being connected between ground and the emitters of the transistors 60 and 40, respectively, and with the resistor 102 being connected between the emitters of these transistors.

The demodulator transistors 71 and 72 have their collectors connected, respectively, to the corresponding output terminals 90 and 80. Since the 38 kc. gating signals applied to the base of the transistor 71 are the same as those applied to the base of the transistor 51 and since the transistor 72 is supplied with a constant DC potential which is the same as the DC biasing potential applied to the base of the transistor 52, it can be seen that the transistors 71 and 72 are driven 180° out of phase with the transistors 51 and 52, insofar as the signals applied to the output terminals 80 and 90 are concerned. In other words, when the transistor 51 is rendered conductive by the 38 kc. reference signal from the output of the frequency doubler 14, the transistor 71 also is rendered conductive and the transistors 52 and 72 are rendered nonconductive and vice versa.

As a consequence, when the transistor 51 conducts to supply the desired R signal to the amplifier 81 along with a relatively small component of crosstalk from the L signal, the transistor 71 applies an attenuated R signal plus an even smaller L crosstalk component to the output terminal 90. This attenuated R signal is in phase opposition with the L plus R-crosstalk signal supplied to the terminal 90 by the transistor 52, so that the signal from the transistor 71 is subtracted from the L plus R-crosstalk signal supplied to the terminal 90 by the transistor 52. The magnitude of the attenuated R component obtained from the transistor 71 is chosen to be equal to the magnitude of the R-crosstalk component obtained from the output of the transistor 52 at the terminal 90. Thus, the out-of-phase attenuated R signal cancels the R-crosstalk component present at the terminal 90. The small amount of attenuated L-crosstalk component present at the output of the transistor 71 also is subtracted from the desired L output from the transistor 52 and present on the terminal 90, but this reduction in the L output is so small, due to the high degree of attenuation which takes place in the signals applied to the emitter of the transistor 60, that it has no noticeable effect on the output obtained from the amplifier 91 and speaker 93 in the circuit.

A similar cancellation also occurs of the undesired L-crosstalk signal in the R output obtained from the terminal 80 by the operation of the demodulator transistor 72, providing an attenuated L plus attenuated R-crosstalk signal which is combined with the R plus L-crosstalk signal obtained from the principal demodulator transistor 51 for the R channel. Thus, it is seen that an effective elimination or cancellation of crosstalk is obtained by the use of the two demodulators 50 and 70, with both demodulators being supplied with the same input signal, except the demodulator 70 is supplied with a greatly attenuated signal and is operated with its outputs in phase opposition with the first or primary demodulator 50.

In addition to providing crosstalk cancellation, the demodulator 70 fills in the "holes" in the outputs of the demodulator 50 to maintain a constant DC operating point at the inputs to the amplifiers 81 and 91. This constant operating point permits the circuit to be operated without the conventional filtering usually required for eliminating the 38 kc. components, and even harmonics thereof, from the output signals applied to the terminals 80 and 90. In addition, this balanced operation of the demodulator effectively eliminates the need for separate "storecast" filters in the circuit, so long as the output of the frequency doubler 14 is a symmetrical signal output, since no even harmonics then are produced which could beat with the "storecast" signal to produce unwanted interference with the desired signals.

In compatible stereophonic multiplex receivers of the type in which the demodulator circuit 20 is used, it is desirable to provide for monophonic reception whenever the RF or stereo input signal level drops below a predetermined value. In order to accomplish this, a provision for muting the 19 kc. signal separator circuit and thereby preventing the generation of the 38 kc. signal is desirable. This can be accomplished by detecting the signal level present in the IF stages or in the FM detector and preamplifier stage 12 with a stereo mute circuit 115, the output of which may be used to render the 19 kc. separator circuit nonresponsive to the pilot signal. When this occurs, the inputs to the bases of all of the transistors 51, 52, 71 and 72 are obtained from the DC supply and bias all of these transistors into conduction; so that the same input signals are passed by both of the transistors in each of the demodulators to provide the same output signals to the amplifiers 81 and 91. The fact that the outputs of the demodulator 70 are subtracted from the outputs of the demodulator 50 is not noticeable at the speaker outputs. When monaural broadcasts are received, the operation is the same as has just been outlined for weak stereo reception, since the 38 kc. gating signal is not present, due to lack of the 19 kc. pilot signal.

Similarly, it is sometimes desirable to provide for muting of the audio output of the stereophonic receiver whenever the receiver is tuned between the stations or for other reasons. For interstation muting the output of the FM detector and preamplifier stage 12 may be monitored by an audio mute circuit 16 which provides an output rendering the transistor 30 nonresponsive to signals whenever the audio mute circuit 16 is operated. Thus no AC signals are passed through the demodulator stages 50 and 70, so that no AC interstation noise components are amplified and applied to the output loudspeakers 83 and 93. At this time the audio mute merely substitutes a DC bias, free of AC signals, to the base of the transistor 40.

We claim:

1. A crosstalk cancellation circuit for use in conjunction with a stereophonic demodulator comprising in combination:
   - a first stereophonic demodulator;
   - means for supplying input signals to be demodulated to the first demodulator, said demodulator producing crosstalk components at its outputs,
   - a second stereophonic demodulator having its outputs connected to the outputs of the first demodulator in phase opposition thereto; and
   - means for attenuating the output signals supplied by the second demodulator, the amount of attenuation being proportional to the magnitude of said crosstalk components.

2. The combination according to claim 1 wherein said first and second demodulators are synchronous gated demodulators and further including means for supplying gating signals to said demodulators and wherein said demodulators each provide first and second outputs corresponding to right and left stereophonic outputs.

3. A crosstalk cancellation circuit for use in conjunction with a stereophonic demodulator comprising in combination:
   - a first stereophonic demodulator;
   - means for supplying input signals to be demodulated to the first demodulator, said demodulator producing crosstalk components at its outputs.
   - a second stereophonic demodulator having its outputs connected to the outputs of the first demodulator in phase opposition thereto: and
   - means for supplying attenuated input signals to the second demodulator, the amount of attenuation being proportional to the magnitude of said crosstalk components.

4. The combination according to claim 3 wherein said first and second demodulators are synchronous gated demodulators and further including means for supplying gating signals to said demodulators and wherein said demodulators each provide first and second outputs corresponding to right and left stereophonic outputs.

5. The combination according to claim 4 wherein the means for supplying input signals to the demodulators each includes an input transistor having at least base and emitter electrodes, and where input signals for the first demodulator are applied to the base of the input transistor for the demodulator and further wherein input signals for the input transistor for the second demodulator are supplied through an attenuating circuit from the emitter of the input transistor for the first demodulator to the input transistor for the second demodulator.

6. The combination according to claim 5 wherein the base of the input transistor for the second demodulator is connected to a predetermined reference potential and wherein the input signals for the input transistor for the second demodulator are applied through the attenuating circuit to the emitter thereof.

7. The combination according to claim 6 wherein the attenuating circuit includes a predetermined impedance connected between the emitters of the input transistors for the first and second demodulators.

8. The combination according to claim 6 wherein the emitters of the input transistors are connected together through a pair of resistors with an additional resistance being connected between the junction of said pair of resistors and a point of reference potential.

9. A continuous wave receiver of the type for receiving composite stereophonic multiplex radio signals including an integrated demultiplexing circuit comprising in combination:
   - first and second input transistors formed as part of said integrated circuit, the first input transistor being supplied with said composite signals;
   - first and second synchronous demodulators, each having a pair of outputs and each including a pair of switching transistors supplied with signals from the first and second input transistors, respectively, and formed as part of said integrated circuits the first demodulator producing crosstalk components at its outputs;
   - means for providing the second input transistor with signals from the output of the first input transistor, said provided signals being attenuated with respect to the signals supplied to the first demodulator; and
   - means for combining the output of the two demodulators out of phase so that the output from the second demodulator is subtracted from the output of the first demodulator.

10. The combination according to claim 9 wherein the attenuation of the signals supplied to the second demodulator is adjusted so that the outputs of the second demodulator are equal in magnitude to the magnitude of the crosstalk components present in the outputs of the first demodulator.

11. The combination according to claim 10 wherein the attenuation of the signals provided to the second demodulator is obtained by a predetermined impedance inserted into the input circuit for the second demodulator.

12. The combination according to claim 11 wherein the first and second input transistors have at least base and emitter electrodes and wherein the composite signals are supplied to the base of the first input transistor and wherein the signals from the output of the first input transistor provided to the second input transistor are applied through an impedance to the emitter of the second input transistor, with the base of the second input transistor being connected to a predetermined reference potential.

13. The combination according to claim 12 wherein each pair of switching transistors in the first and second demodulators includes first and second transistors having base, emitter, and collector electrodes, and wherein the collector electrodes of the first transistors of each pair are connected together to a common output terminal, the collector electrodes of the second transistors of each pair are connected together to a common output terminal, and the emitters of the first and second transistors in each of said pairs are connected together to the collector electrode of the input transistor for the respective demodulator pair, and further including means for alternately switching the first and second transistors of each of the demodulators between a state of conduction and nonconduction, with the first transistor of the first demodulator being rendered conductive simultaneously with the second transistor of the second demodulator and the second transistor of the first demodulator being rendered conductive simultaneously with the first transistor of the second demodulator by said switching means.

14. In a stereophonic receiver, a stereophonic demodulator circuit comprising in combination:

a first stereophonic demodulator;

means for supplying input signals to be demodulated to the input of the first demodulator, said demodulator producing demodulated stereophonic signals at first and second outputs;

a second stereophonic demodulator having first and second outputs connected to the outputs of the first demodulator in phase opposition thereto; and means for providing the same DC operating signal levels to both of the demodulators so that a constant DC operating point is provided at the outputs of the demodulators.

15. The combination according to claim 14 wherein the first and second demodulators are synchronous gated demodulators, and further including means for supplying gating signals to the demodulators wherein the demodulators each provide first and second outputs with the first output of the first demodulator being connected to the second output of the second demodulator and with the second output of the first demodulator being connected to the first output of the second demodulator, so that the gating signal components are cancelled from the outputs of the demodulators.

16. The combination according to claim 15 wherein the first and second synchronous demodulators each include a pair of switching transistors supplied with the gating signals and with input signals to be demodulated being supplied in parallel to the pair of switching transistors in the first demodulator.

* * * * *

UNITED STATES PATENT OFFICE

CERTIFICATE OF CORRECTION

Patent No. 3,617,641 Dated November 2, 1971

Inventor(s) James H. Feit et al.

It is certified that error appears in the above-identified patent and that said Letters Patent are hereby corrected as shown below:

On the cover sheet [72] "James H. Fiet" should read -- James H. Feit --.

Signed and sealed this 1st day of August 1972.

(SEAL)
Attest:

EDWARD M.FLETCHER,JR.
Attesting Officer

ROBERT GOTTSCHALK
Commissioner of Patents